Figure 1:
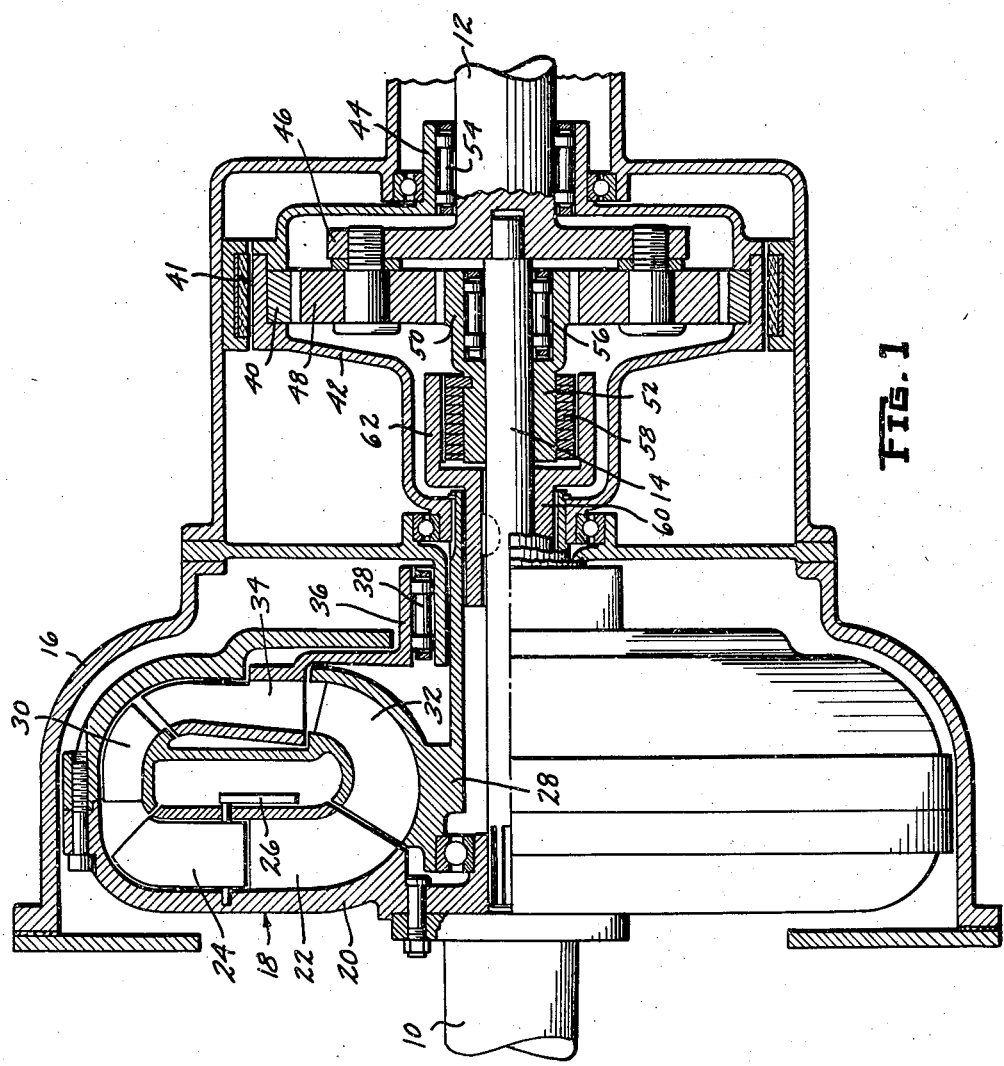

July 21, 1942.   A. Y. DODGE   2,290,319
TRANSMISSION
Filed Sept. 25, 1940    3 Sheets-Sheet 1

INVENTOR.
ADIEL Y. DODGE
BY McConkey Dawson & Booth
ATTORNEYS.

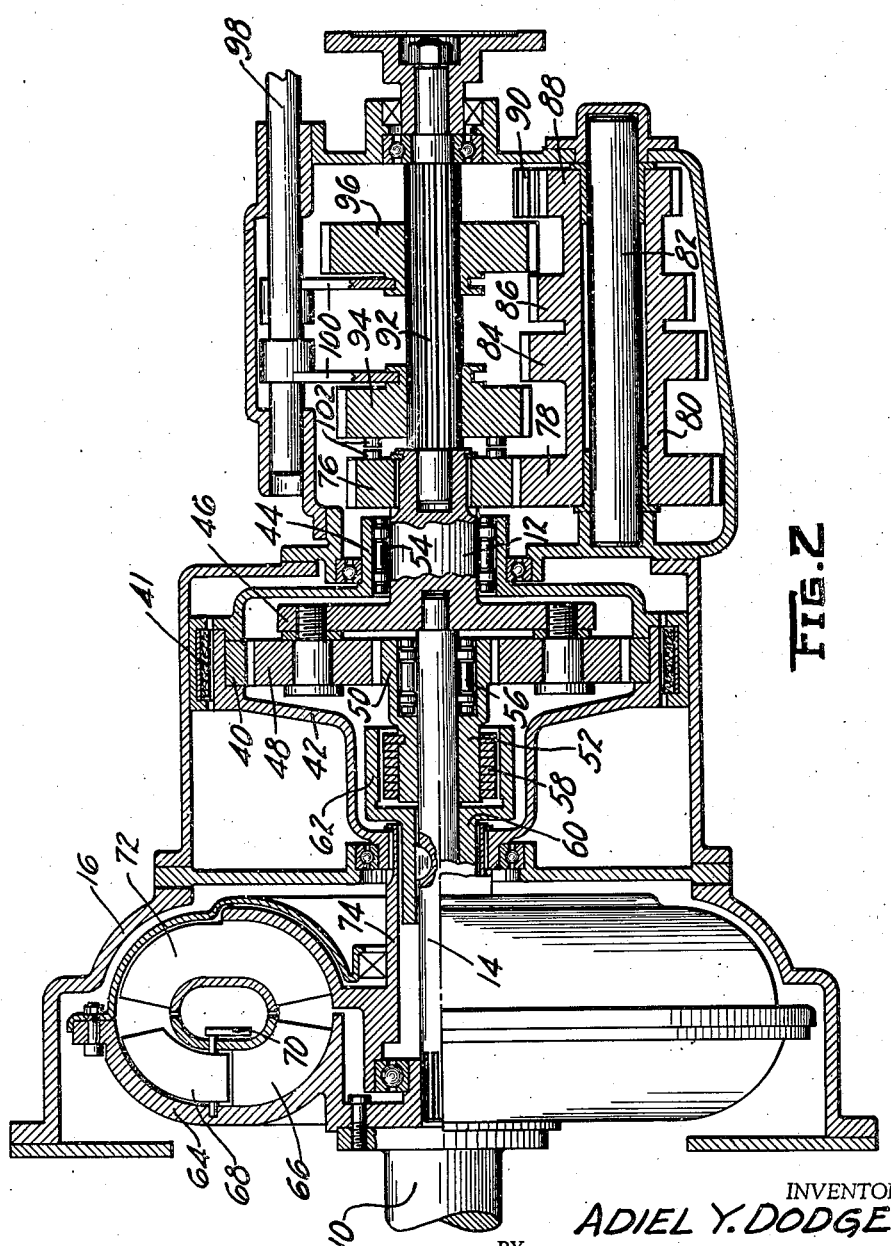

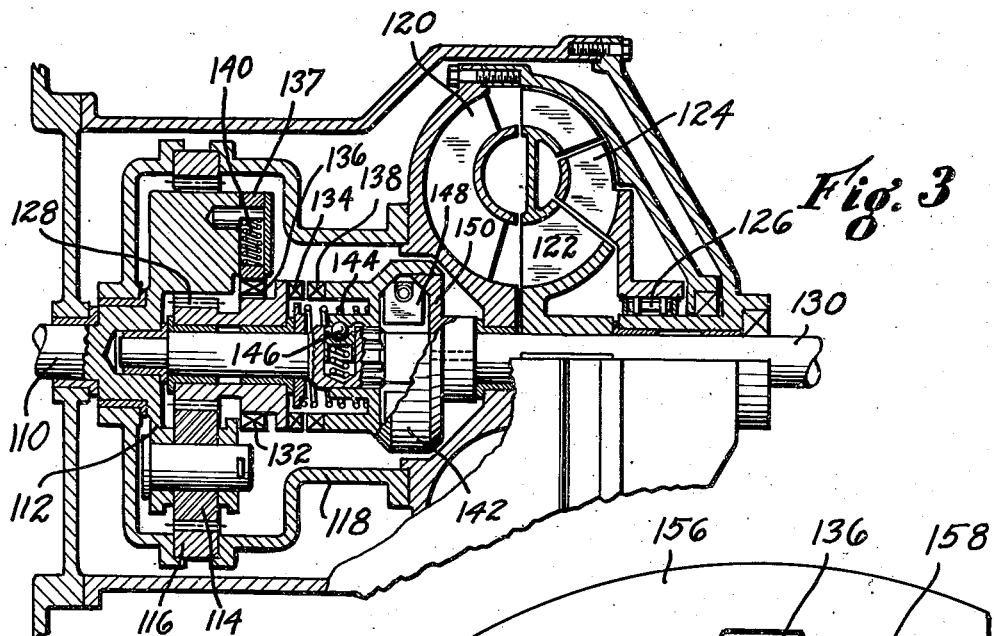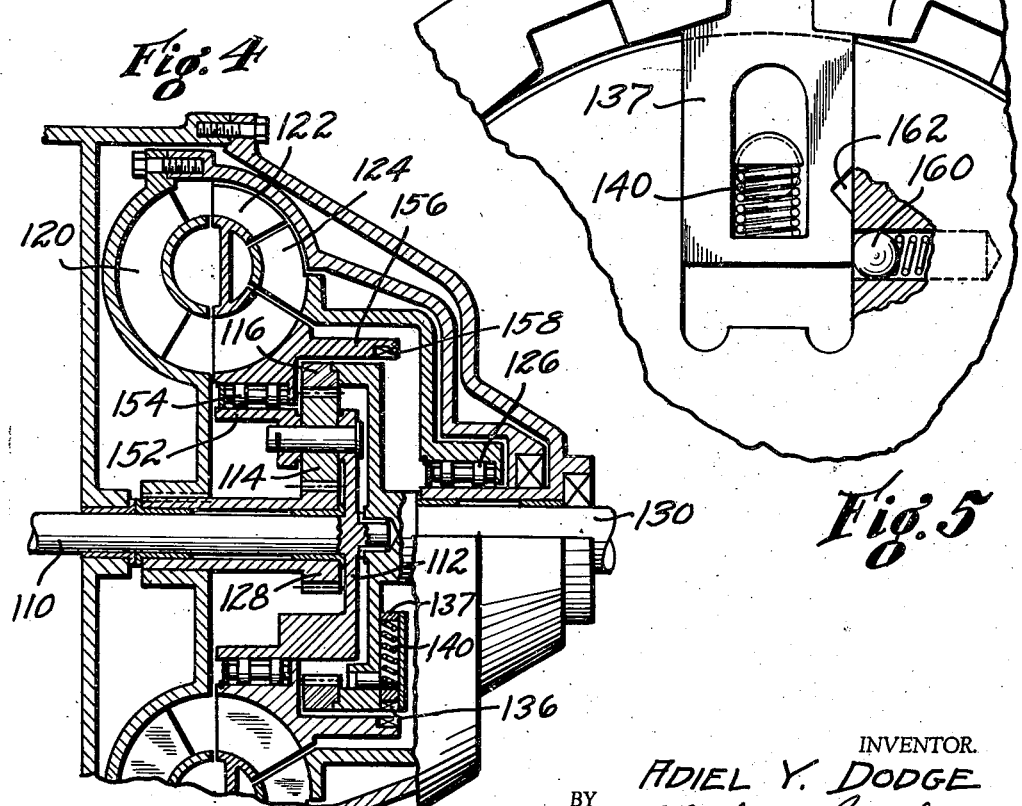

Patented July 21, 1942

2,290,319

UNITED STATES PATENT OFFICE 2,290,319

TRANSMISSION

Adiel Y. Dodge, Rockford, Ill.

Application September 25, 1940, Serial No. 358,321

25 Claims. (Cl. 74—189.5)

This invention relates to transmissions and more particularly to transmissions for motor vehicles and the like.

It is one of the objects of the invention to provide a transmission which is infinitely variable through one or more speed ranges and which provides for relatively high engine speeds at starting and slow speed operation.

Another object of the invention is to provide a transmission including an infinitely variable speed unit so arranged that only a part of the transmitted torque flows through the unit at higher engine speeds.

Still another object is to provide a transmission which drives directly through an infinitely variable speed unit at starting and at higher speeds drives through two parallel paths of power flow.

Other objects relate to the provision of a transmission in which free wheeling is prevented, in which the drag at idling speeds is reduced, which permits the engine to turn up to a higher stall speed, and which operates at high efficiency throughout its entire speed and torque range.

The above and other objects, advantages and novel features of the invention will be apparent from the following description of the accompanying drawings, in which:

Figures 1, 2, 3 and 4 are axial sections with parts in elevation of four transmissions embodying the invention; and Figure 5 is an enlarged partial view of an automatic clutch.

The transmission of Figure 1 connects a driving shaft 10 which may be the crank shaft of an internal combustion engine to a driven shaft 12 which may be connected to the rear wheels of an automobile or to any other mechanism to be driven either directly or through a gear set such as is shown in Figure 2. As shown the driving shaft 10 has an extension 14 journaled at one end in the shaft 12 to maintain the shafts in alignment.

The transmission includes an outer stationary casing 16 coaxial with the driving and driven shafts within which is arranged an infinitely variable speed torque multiplying unit shown as a hydraulic torque converter indicated generally at 18. The torque converter includes an impeller casing 20 secured to the driving shaft 10 and carrying a set of fixed impeller vanes 22. Adjacent the outlet end of the vanes 22 a set of vanes 24 are pivoted in the casing 20. The vanes 24 tend to be turned in one direction about their pivotal mounting by reaction of the driving liquid and centrifugal weights 26 tend to turn them in the opposite direction.

A rotor sleeve or hub 28 carries a set of vanes 30 adjacent the outlet ends of the vanes 24 and a second set of vanes 32 adjacent the inlet ends of the vanes 20. Between the sets of vanes 30 and 32 there is arranged a set of stator vanes 34 carried by a hub 36 which is mounted on an extension of the fixed casing 16 by a combined one-way brake and bearing 38 which may be of the type disclosed and claimed in my Patent No. 2,113,722. By this means the stator is prevented from turning backwards but is permitted to turn forwards as the driving ratio of the torque converter approaches unity. The torque converter herein has been illustrated more or less diagrammatically but it will be understood that it might take the form of any of the torque converters more particularly described and claimed in any of my copending applications Serial Nos. 3,544, filed January 26, 1935, 57,520, filed January 4, 1936, or 95,117, filed August 10, 1936, or that any other desired type of infinitely variable torque multiplying unit might be employed.

The transmission further includes a planetary gear set comprising a ring gear 40 connected to a supporting member 42 which is splined to the rotor sleeve 28 and has a sleeve extension 44 around the driven shaft 12. If desired a friction brake 41 may be provided to engage the ring gear to brake the transmission. This is particularly desirable when the shaft 12 is connected to a shifting gear unit to facilitate shifting. The driven shaft 12 is provided with a flanged extension forming a gear carrier 46 carrying a plurality of planet gears 48 which mesh with the ring gear 40 and with a sun gear 50 carried by a sleeve 52 which is rotatable on the shaft extension 14. A one-way clutch and bearing 54 is provided between the sleeve portion 44 and the shaft 12 to prevent the portion 44 from over-running the shaft 12 forwardly. A similar clutch member 56 may be provided between the sun gear 50 and the driving shaft extension 14 to prevent free wheeling if desired. This clutch member prevents the sun gear from over-running the driving shaft forwardly.

In order to connect the sun gear drivably to the shaft extension 14 there is provided according to the present invention a coiled clutch member 58 wrapped around and secured at one end to the sun gear sleeve 52. The shaft 14 carries an offset sleeve member 60 drivably keyed thereto and having a portion 62 surrounding and spaced slightly from the clutch member 58.

In operation the driving shaft turns the impeller casing 22 and through liquid contained therein drives the rotor 28 at an increased torque as is well understood in the art. This turns the ring gear support 42 and the sleeve 44 forwardly and drives the driven shaft 12 forwardly through the clutch 54. At low speeds, since both the ring gear and the gear carrier 46 are turned forwardly at the speed of the rotor 28, the planetary gear set will turn as a unit and the driven shaft will be driven directly through the torque converter 18. At this time the clutch 58 is disengaged and the clutch 56 is inactive since the sun gear 50 is turning at a lower speed forward than the driving shaft 14.

As the speed increases, centrifugal force acting on the clutch 58, will expand it into engagement with the sleeve 62 and the friction drag thereon will wrap it tightly against the sleeve 62. This establishes a driving connection in the forward direction between the shaft 14 and the sun gear 50. Thereafter the driven shaft is driven through the planet gears 48 jointly by the ring gear 40 and the sun gear 50 in two paths of power flow as described in my application Serial No. 723,083, filed April 30, 1934, and in my Reissue Patent No. 20,846. At this time the clutch 54 overruns since the driven shaft is normally turning faster than the ring gear 40.

If the driven shaft 12 should tend to overrun the driving shaft as in coasting down a hill or the like the clutch 58 would tend to release. This would produce a condition of free wheeling and if it is desired to prevent such operation, a clutch such as 56 may be provided. This clutch will prevent the sun gear 50 from overrunning the driving shaft 14 so that the driving and driven shafts will be connected through the transmission at all times and overrunning of the driven shaft will be resisted by the torque converter.

Figure 2 illustrates another type of transmission in which a fluid flywheel or clutch is employed in place of the torque converter of Figure 1. Since a great many of the parts are identical with those of Figure 1 they have been indicated by the same reference numbers.

As shown the driving shaft 10 is connected to an impeller casing 64 of a fluid flywheel. Rigid vanes 66 and pivoted vanes 68 controlled by weights 70 are mounted in the casing 64 and cooperate with rotor vanes 72 on a rotor hub 74 to form a fluid circuit. The hub 74 is splined to the ring gear supporting member 42. This construction forms a fluid flywheel or clutch whose action is well known in the art.

The shaft 12 is shown carrying a gear 76 meshing with a gear 78 which is formed on a sleeve 80 rotatable on a lay shaft 82. The sleeve 80 also carries gears 84, 86 and 88 of different sizes, the gear 88 meshing with the usual reverse idler 90. An output or driven shaft 92 is arranged coaxially with the shaft 12 and has slidably splined thereon two shiftable gears 94 and 96 which are controlled by shift rods 98 through forks 100. The gears 76 and 94 are provided with mating clutch teeth 102 through which they may be connected for direct drive.

The illustrated shifting unit is a conventional type providing three forward speeds and reverse but it will be understood that more or less speed ratios could be provided if desired or that other types of shifting units could be provided.

The parts are shown in the neutral position in which there is no driving connection between shafts 12 and 92. To start, the gear 96 may be shifted into mesh with gear 86, brake 41 being engaged to facilitate this operation if desired. The drive initially is through the fluid clutch to the member 42, through clutch 54 to shaft 12 and gear 76, to gear 78 and sleeve 80 and gear 86 to gear 96 and shaft 92. Thus at the start the drive is directly through the fluid clutch to the gear 76 and since the clutch may be made smaller than usual due to the novel combination with the gear set a higher engine speed at starting is provided. The smaller clutch also reduces drag at idling speeds so that the gears need not be disengaged on a stopping.

As the speed increases the clutch 58 will engage the sleeve 62 to connect the driving shaft extension 14 with the sun gear 50. At this time two-path drive is provided so that the fluid clutch carries only a part of the transmitted torque. It is for this reason that a smaller clutch may be used.

As the speed increases further the gears 94 and 96 may be shifted to disengage gear 96 from gear 86 and engage gear 94 with gear 84. Thus a higher speed range is provided. For direct drive through the gear set the gear 94 may be shifted to engage clutch members 102, thereby connecting shafts 12 and 92 directly. For reverse, gear 96 may be shifted into mesh with the idler 90.

Figure 3 illustrates a somewhat different type of transmission in which one element of the gear set is connected directly to the driving shaft and the impeller of the hydraulic unit is driven by another element of the gear set. As shown, a driving shaft 110 is connected to a gear carrier 112 rotatably supporting a plurality of planet gears 114. The gears 114 mesh with a ring gear 116 connected by a frame work 118 to the impeller or driving member 120 of a hydraulic torque converter. The torque converter as shown includes a rotor or driven member 122 and a stator 124 held against reverse rotation by a one-way brake 126.

The planet gears 114 also mesh with a sun pinion 128 formed on a sleeve which is rotatable on an extension of the driven shaft 130. The sleeve is formed with two sets of clutch teeth 132 and 134 meshing respectively with the clutch teeth 136 and 138. The teeth 136 are carried by sliding blocks 137 slidably mounted on the gear carrier 112 and urged inwardly into engagement with the teeth 132 by springs 140. Below a predetermined speed the springs 140 hold the teeth 136 in engagement with the teeth 132 to connect the gear carrier and the sun gear. Above a predetermined speed centrifugal force on the blocks 137 is sufficient to overcome the springs 140 and when the pressure on the clutch teeth is relieved temporarily, as for example by temporarily slowing down the driving engine, the blocks 137 will move outwardly to disconnect the gear carrier and the sun gear.

The clutch teeth 138 are carried by a block or sleeve 142 splined on the driven shaft 130. A spring 144 urges the sleeve 142 to the right as shown in Figure 3 normally to disengage the clutch teeth 134 and 138. Preferably a spring detent 146 is provided normally tending to hold the sleeve 142 in either its right or left hand position.

The sleeve 142 is shifted by means of centrifugal weights 148 engageable with an angular surface on the sleeve and an angular surface on a fixed flange 150. As the weights 148 move out under the influence of centrifugal force they cam the sleeve 142 to the left to bring the teeth 134 and 138 into engagement. Preferably all of the clutch teeth 132, 134, 136 and 138 are formed with ejection angles so that they will not move into mesh until their speeds are substantially synchronized.

In operation at low speeds the gear unit is locked out by the clutch teeth 132 and 136 and turns as a unit so that the impeller 120 is driven at the same speed as the driving shaft 110. The impeller turns the rotor 122 which is keyed to the driven shaft so that the driven shaft is driven hydraulically at an increased torque. As the speed increases, the sleeve 142 first tends to move to the left to bring clutch teeth 138 into engagement with clutch teeth 134. Meshing of these teeth, however, is prevented due to the ejection angle thereon. At about the same speed or a slightly higher speed the blocks 137 tend to move outwardly, but are held in their engaged position by the pressure on the clutch teeth. At this time if the torque load is temporarily relieved, as for example by temporarily closing the engine throttle, the blocks 137 will move out and the sleeve 142 will move to the left.

At this time the driving shaft 110 drives the gear carrier and the torque thereon is divided, a part of it flowing to the ring gear 116 and the impeller 120 through the hydraulic unit to the driven shaft while the remainder of the torque from the planet pinions goes directly to the sun gear 128 and through clutch 134 and 138 to the driven shaft. Thus a two-path flow of torque is provided similar to that described above in connection with Figure 1. At this time the impeller is caused to turn at speeds above that of the shaft 110 due to shaft 130 and sun gear 128 turning slower than shaft 110, the speeds of the several elements becoming the same as the ratio between the driving and driven shafts approaches unity.

Figure 4 shows a somewhat different arrangement employing a regenerative or run around power circuit at low speeds. Since a number of the parts in this construction are substantially similar to those of Figure 3, like reference numerals have been used to indicate the corresponding parts. As shown in this construction, the gear carrier 112 is connected to the drive shaft 110 and is formed with a flange 152 connected through a one-way clutch 154 to the rotor 122. This clutch prevents the rotor from turning forwardly faster than the driving shaft, but enables the driving shaft to overrun the rotor. The rotor is also formed with a flange 156 formed with a series of clutch teeth 158 adapted to mesh with the clutch teeth 136 on the blocks 137. In this case the blocks 137 are normally urged inwardly by the springs 140 and are urged outwardly by centrifugal force.

The construction of the speed responsive clutch formed by the blocks 137 and flange 156 is better illustrated in Figure 5. As shown in this figure the teeth 158 are formed with an ejection angle and the outer end of the teeth 136 are formed with a similar ejection angle. Thus when the flange 156 is overrunning the ring gear 116 in a clockwise direction the teeth will be held out of engagement until their speeds are substantially synchronized. In order to insure positive engagement of the clutch once it starts in response to centrifugal force a spring detent 160 is preferably provided engaging a notch 162 in the block 137. This detent tends to hold the block in its radial inward position until centrifugal force becomes sufficiently great to cam the detent inwardly against the spring 140, the parts being so proportioned as to insure that this excess force is sufficiently great to move the teeth 136 completely into engagement with the teeth 158 after synchronization.

In operation of the embodiment shown in Figure 4, the driving shaft drives the gear carrier 112 forwardly and the ring gear 116 connected to the driven shaft acts as a fulcrum so that the sun gear 128, which is connected to the impeller 120, will be turned forwardly at an increased speed. The impeller tends to turn the rotor 122 forwardly at increased speed but this is prevented by the one-way clutch 154 as a result of which rotation of the impeller is resisted. This resistance reacting back on the sun gear tends to cause the ring gear 116 and the driven shaft 130 to be turned forwardly at reduced speed and increased torque.

When the speed of the ring gear becomes sufficiently high the clutch 136 will move into engagement with the clutch teeth 158 to connect the driven shaft and the rotor 122. At this time the torque is divided in the planetary gear set, a part of the torque on the planet pinions 114 going directly to the gear 116 and driven shaft while the remainder of the torque goes through the sun gear 128 and the hydraulic unit to the driven shaft. At this time the regenerative circuit is replaced by a two-path power flow circuit of the non-regenerative type as described in connection with Figure 3. This transmission provides an extremely wide range of operation and is highly desirable for some installations in which difference of range is needed.

While several embodiments of the invention have been described in detail, it will be understood that other types of infinitely variable torque transmitting units or either regenerative or non-regenerative differential gears might be employed and that numerous other changes might be made. The embodiments illustrated are therefore not intended as a definition of the scope of the invention, reference being had for this purpose to the appended claims.

This application is a continuation in part of my copending application Serial No. 283,582, filed July 10, 1939.

What is claimed is:

1. A transmission comprising an infinitely variable speed, torque-transmitting unit having a driving member and a driven member, a differential gear set having one element connected to the driven member, a driven shaft connected to another element of the gear set, one way drive means connecting said one element to the driven shaft, and means responsive to the speed of a third element of the gear set to connect said third element to the driving member.

2. A transmission comprising an infinitely variable speed, torque-transmitting unit having a driving member and a driven member, a differential gear set having one element connected to the driven member, a driven shaft connected to another element of the gear set, releasable drive means connecting said one element to the driven shaft, and disengageable means for connecting a third element of the gear set to the driving member.

3. A transmission comprising an infinitely variable speed, torque-transmitting unit having a driving member and a driven member, a differential gear set having one element connected to the driven member, a driven shaft connected to another element of the gear set, one-way drive means connecting said one element to the driven shaft, disengageable means for connecting a third element of the gear set to the driving member, and a one-way clutch for connecting said third element to the driving member to prevent the third element from overrunning the driving member.

4. A transmission comprising an infinitely variable speed, torque-transmitting unit having a driving member and a driven member, a differential gear set having one element connected to the driven member, a driven shaft connected to another element of the gear set, one way drive means connecting said one element to the driven shaft, and one-way clutch means connected to a third element of the gear set and engageable with the driving member above a predetermined speed of said third element and through which the driving member drives the third element.

5. A transmission comprising an infinitely variable speed, torque-transmitting unit having a driving member and a driven member, a differential gear set having one element connected to the driven member, a driven shaft connected to another element of the gear set, one-way drive means connecting said one element to the driven shaft, one-way clutch means connected to a third element of the gear set and engageable with the driving member above a predetermined speed of said third element and through which the driving member drives the third element, and a second one-way clutch between the third element and the driving member to prevent the third element from overrunning the driving member.

6. A transmission comprising an infinitely variable speed, torque-transmitting unit having a driving member and a driven member, a differential gear set having one element connected to the driven member, a driven shaft connected to another element of the gear set, one-way drive means connecting said one element to the driven shaft, a spiral clutch element connected at one end to a third element of the gear set, and a sleeve secured to the driving member and surrounding said clutch element, whereby the clutch element will be thrown out in response to centrifugal force above a predetermined speed of the third element to connect the sleeve and driving member to the third element.

7. A transmission comprising an infinitely variable speed, torque-transmitting unit having a driving member and a driven member, a planetary gear set having its ring gear connected to the driven member, a driven shaft connected to the planet carrier of said gear set, one-way drive means connecting the ring gear and driven shaft through which the ring gear may directly drive the driven shaft, and speed responsive means for connecting the sun gear of the gear set to the driving member above a predetermined transmission speed.

8. A transmission comprising an infinitely variable speed, torque-transmitting unit having a driving member and a driven member, a planetary gear set having its ring gear connected to the driven member, a driven shaft connected to the planet carrier of said gear set, one-way drive means connecting the ring gear and driven shaft through which the ring gear may directly drive the driven shaft, speed responsive means for connecting the sun gear of the gear set to the driving member above a predetermined transmission speed, and a one-way clutch for preventing the sun gear from overrunning the driving member.

9. A transmission for connecting a driving shaft to a driven shaft comprising an infinitely variable speed, torque-transmitting unit having a driving member connected to the driving shaft and a driven member, a one-way clutch connecting the driven member to the driven shaft, a differential gear set having one element connected to the driven member and another element connected to the driven shaft, and speed responsive means for connecting a third element of the gear set to the driving shaft above a predetermined transmission speed.

10. A transmission for connecting a driving shaft to a driven shaft comprising an infinitely variable speed, torque-transmitting unit having a driving member connected to the driving shaft and a driven member, a one-way clutch connecting the driven member to the driven shaft, a differential gear set having one element connected to the driven member and another element connected to the driven shaft, and means responsive to the speed of a third element of the gear set for connecting said third element to the driving shaft to be driven thereby in a forward direction.

11. A transmission for connecting a driving shaft to a driven shaft comprising an infinitely variable speed, torque-transmitting unit having a driving member connected to the driving shaft and a driven member, a one-way clutch connecting the driven member to the driven shaft, a differential gear set having one element connected to the driven member and another element connected to the driven shaft, a sleeve secured to the driving shaft, and a coiled clutch element secured at one end to a third element of the gear set and lying within said sleeve to be expanded against the sleeve by centrifugal force, thereby connecting the driving shaft and the third element.

12. A transmission for connecting a driving shaft to a driven shaft comprising an infinitely variable speed, torque-transmitting unit having a driving member connected to the driving shaft and a driven member, a one-way clutch connecting the driven member to the driven shaft, a planetary gear set having its sun gear formed with an elongated hub rotatable on the driving shaft and its other elements connected respectively to the driven member and the driven shaft, a coiled clutch element on said hub, and a sleeve secured to the driving shaft and surrounding said clutch element, said clutch element normally clearing the sleeve but being movable into driving engagement therewith in response to centrifugal force.

13. A transmission for connecting a driving shaft to a driven shaft comprising an infinitely variable speed, torque-transmitting unit having a driving member connected to the driving shaft and a driven member, a one-way clutch connecting the driven member to the driven shaft, a planetary gear set having its sun gear formed with an elongated hub rotatable on the driving shaft and its other elements connected respectively to the driven member and the driven shaft, a coiled clutch element on said hub, a sleeve secured to the driving shaft and surrounding said clutch element, said clutch element normally clearing the sleeve but being movable into driving engagement therewith in response to centrifugal force, and a one-way clutch between the sun gear and the driving shaft to prevent the sun gear from overrunning the driving shaft.

14. A transmission for connecting a driving shaft to a driven shaft comprising a hydraulic torque transmitting device including an impeller connected to the driving shaft and a rotor, a one-way clutch connecting the rotor to the driven shaft, a differential gear set having one element connected to the rotor and another element connected to the driven shaft, and means responsive to the speed of a third element of the gear set to connect the third element to the driving shaft.

15. A transmission for connecting a driving shaft to a driven shaft comprising a hydraulic torque transmitting device including an impeller connected to the driving shaft and a rotor, a one-way clutch connecting the rotor to the driven shaft, a differential gear set having one element connected to the rotor and another element connected to the driven shaft, means responsive to the speed of a third element of the gear set to connect the third element to the driving shaft, and one-way clutch between the third element and the driving shaft to prevent the third element from overrunning the driving shaft.

16. A transmission for connecting a driving shaft to a driven shaft comprising an infinitely variable speed torque-multiplying unit having a driving member connected to the driving shaft, a driven member, and a reaction member forming a fulcrum for torque multiplication, a differential gear set having one element connected to the driven member, one-way drive means between said one element and another element of the gear set to drive said other element forwardly, said other element being connected to the driven shaft, and disengageable means for connecting a third element of the gear set to the driving shaft.

17. A transmission for connecting a driving shaft to a driven shaft comprising a hydraulic torque converter having a vaned impeller connected to the driving shaft, a vaned rotor, and a vaned stator forming a fulcrum for torque multiplication, a differential gear set having one element connected to the rotor, one-way drive means between said one element and another element of the gear set to drive said other element forwardly, said other element being connected to the driven shaft, and disengageable means for connecting a third element of the gear set to the driving shaft.

18. A transmission for connecting driving and driven shafts comprising a hydraulic torque transmitting device having driving and driven members, means connecting one of said members to one of the shafts, a differential gear set, means connecting one element of the gear set to one of the shafts, means connecting another element of the gear set to the other of said members, and disengageable means for connecting a third element of the gear set to the other of the shafts.

19. A transmission for connecting driving and driven shafts comprising a hydraulic torque transmitting device having driving and driven members, a differential gear set, the driving shaft being connected to one element of the gear set, means connecting another element of the gear set to one of said members, automatically operable clutch means connected to said one element of the gear set and operable in response to the speed thereof to establish one set of driving conditions through the transmission, and a second automatically operable clutch for connecting a third element of the gear set to the other of said members to establish a different set of driving conditions through the transmission.

20. A transmission for connecting driving and driven shafts comprising a hydraulic torque transmitting device having driving and driven members, a differential gear set, means connecting one element of the gear set to the driving shaft, means connecting another element of the gear set to said driving member, said driven member being connected to the driven shaft, speed responsive clutch means connecting the driving shaft to a third element of the gear set below a predetermined speed of the driving shaft, and speed responsive clutch means connecting said third element to the driven shaft above said predetermined speed.

21. A transmission for connecting a driving shaft to a driven shaft comprising a planetary differential gear set, a hydraulic torque transmitting device including a vaned impeller and a vaned rotor forming a toroidal liquid circuit, means connecting said rotor to the driven shaft, means connecting one element of the gear set to the driving shaft, means connecting another element of the gear set to the impeller, and clutch means operable when engaged to connect a third element of the gear set to the driven shaft.

22. A transmission for connecting a driving shaft to a driven shaft comprising a planetary differential gear set, a hydraulic torque transmitting device including a vaned impeller and a vaned rotor forming a toroidal liquid circuit, means connecting said rotor to the driven shaft, means connecting one element of the gear set to the driving shaft, means connecting another element of the gear set to the impeller, and clutch means operable in response to the speed of the driven shaft to connect a third element of the gear set to the driven shaft.

23. A transmission for connecting a driving shaft to a driven shaft comprising a planetary differential gear set, a hydraulic torque transmitting device including a vaned impeller and a vaned rotor forming a toroidal liquid circuit, means connecting said rotor to the driven shaft, means connecting one element of the gear set to the driving shaft, means connecting another element of the gear set to the impeller, clutch means providing a mechanical connection for direct drive between the driving shaft and the impeller, and a second clutch means to connect a third element of the gear set to the driven shaft.

24. A transmission for connecting driving and driven shafts comprising a hydraulic torque transmitting device having driving and driven members, a differential gear set, means connecting one element of the gear set to one of said members, means for connecting another element of the gear set to the other of said members, one of said connecting means being a disengageable clutch, means connecting one of the shafts to a third element of the gear set, means connecting one of said members to the other shaft to provide a two-path drive through the transmission when said clutch is engaged, and clutch means for providing a mechanical connection for direct drive between said one of the shafts and the member other than the last named one of said members to provide a single path drive through the hydraulic device.

25. A transmission for connecting driving and driven shafts comprising a hydraulic torque converter having a vaned driving member, a vaned driven member and a vaned stator forming a fulcrum for torque multiplication, a differential gear set, means connecting one element of the gear set to one of said members, means for connecting another element of the gear set to the other of said members, one of said connecting means being a disengageable clutch, means connecting one of the shafts to a third element of the gear set, means connecting one of said members to the other shaft to provide a two-path drive through the transmission when said clutch is engaged, and clutch means for providing a mechanical connection for direct drive between said one of the shafts and the member other than the last named one of said members to provide a single path drive through the hydraulic device.

ADIEL Y. DODGE.